Figure 1:
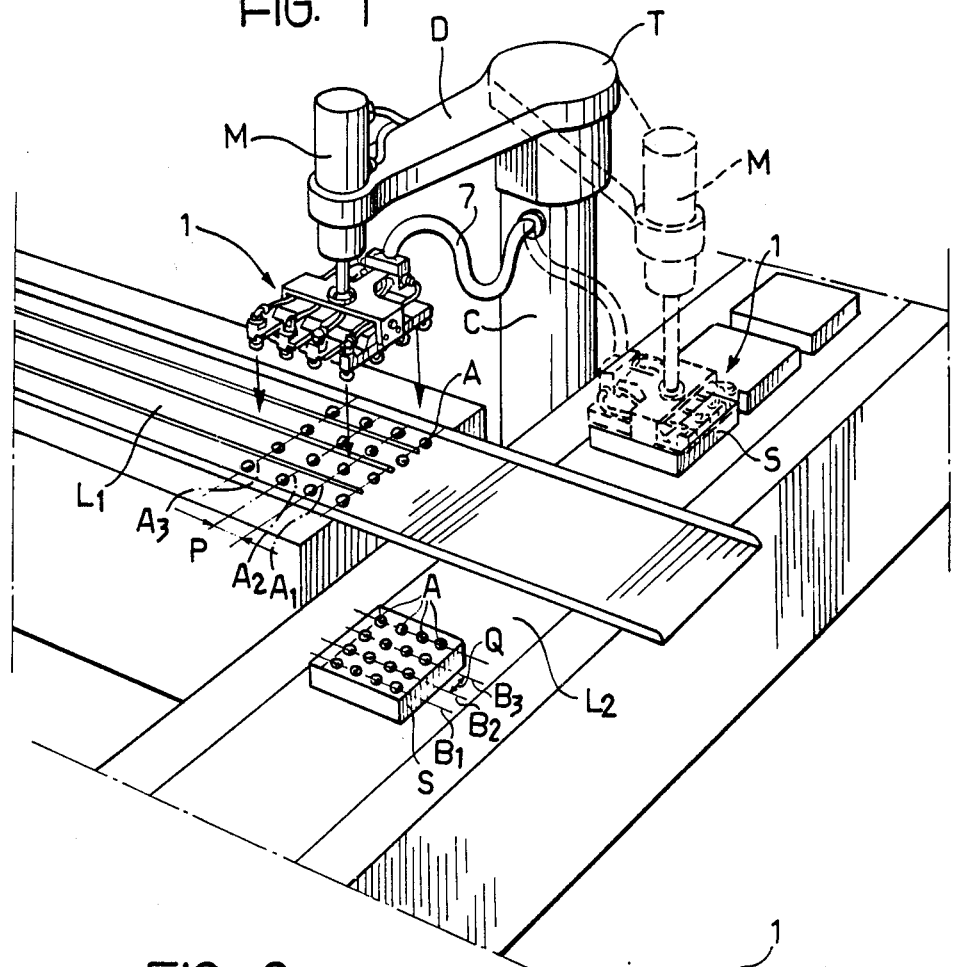

United States Patent [19]

Ferrero

[11] Patent Number: 4,832,180
[45] Date of Patent: May 23, 1989

[54] PICK-UP DEVICE, PARTICULARLY FOR AUTOMATIC LIFTING AND CONVEYING APPARATUS FOR PLANTS FOR THE PACKAGING OF FOOD PRODUCTS

[75] Inventor: Pietro Ferrero, Brussels, Belgium

[73] Assignee: Ferrero S.p.A., Alba, Italy

[21] Appl. No.: 25,821

[22] Filed: Mar. 13, 1987

[30] Foreign Application Priority Data

Jul. 19, 1986 [IT] Italy .................... 67219 A/86

[51] Int. Cl.$^4$ .................................... B65G 37/00
[52] U.S. Cl. .................... 198/468.3; 414/627; 294/65; 294/87.1
[58] Field of Search ............. 198/468.3; 53/247; 294/65, 87.1; 414/744 A, 744 B, 627; 901/40

[56] References Cited

U.S. PATENT DOCUMENTS 3,374,600 3/1968 Rademacher et al. .
3,753,589 8/1973 Hahn .................... 294/87.1

FOREIGN PATENT DOCUMENTS 2610066 11/1976 Fed. Rep. of Germany ... 198/468.3
1019806 2/1966 United Kingdom .

Primary Examiner—Joseph E. Valenza
Attorney, Agent, or Firm—Bernard, Rothwell & Brown

[57] ABSTRACT

A pick-up device for automatic lifting and conveying apparatus has a plurality of pick-up members (5), preferably of the suction type, each of which is intended to take hold of a respective article in an array of rows arranged in at least one direction. The device includes a plurality of generally elongate and mutually parallel support members (4) which are intended to be oriented in the direction of the rows of articles in use. Each support member (4) carries an associated respective row of pick-up members (5) extending longitudinally of the member itself. A drive (9) enables the distance between adjacent support members (4) to be varied so as to allow them to be adapted selectively to the spacing between the rows of articles. More particularly, this distance may be varied while the device is transferring the articles supported by the pick-up members (5) to a package so as to adapt the separation between the rows of articles to the dimensions of the package itself. Provision is made for the possibility of selectively varying the distance between the pick-up members (5) of each support member (4).

5 Claims, 3 Drawing Sheets

PICK-UP DEVICE, PARTICULARLY FOR AUTOMATIC LIFTING AND CONVEYING APPARATUS FOR PLANTS FOR THE PACKAGING OF FOOD PRODUCTS

The present invention relates to pick-up devices and relates particularly to pick-up devices including a plurality of pick-up members.

In general, each of these pick-up members is intended to take hold of a respective article in an array comprising rows arranged in at least one direction. The device according to the invention has been developed for possible use in the field of automatic lifting and conveyor apparatus for a plant for the packaging of food products, for example, confectionery products such as chocolates, chocolate eggs, etc.

The object of the present invention is to provide a pick-up device in which it is possible to adapt the relative position between the pick-up members easily to the spacing between the rows of articles which are to be held, as well as to vary the relative position selectively during the transport of the articles so as to adapt it to the dimensions of a conveyor line or a package in which the articles are subsequently to be deposited.

According to the present invention, this object is achieved by pick-up device of the type specified above, characterized in that it comprises:

a plurality of generally elongate and mutually parallel support members, each of which carries an associated respective row of pick-up members extending longitudinally of the support member itself, and drive means interposed between the support members and able, when activated, to move the support members towards and away from each other.

Figure 3:
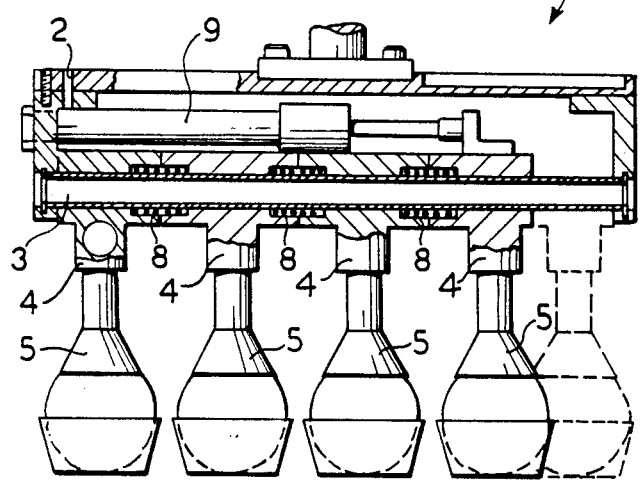
Figure 2:
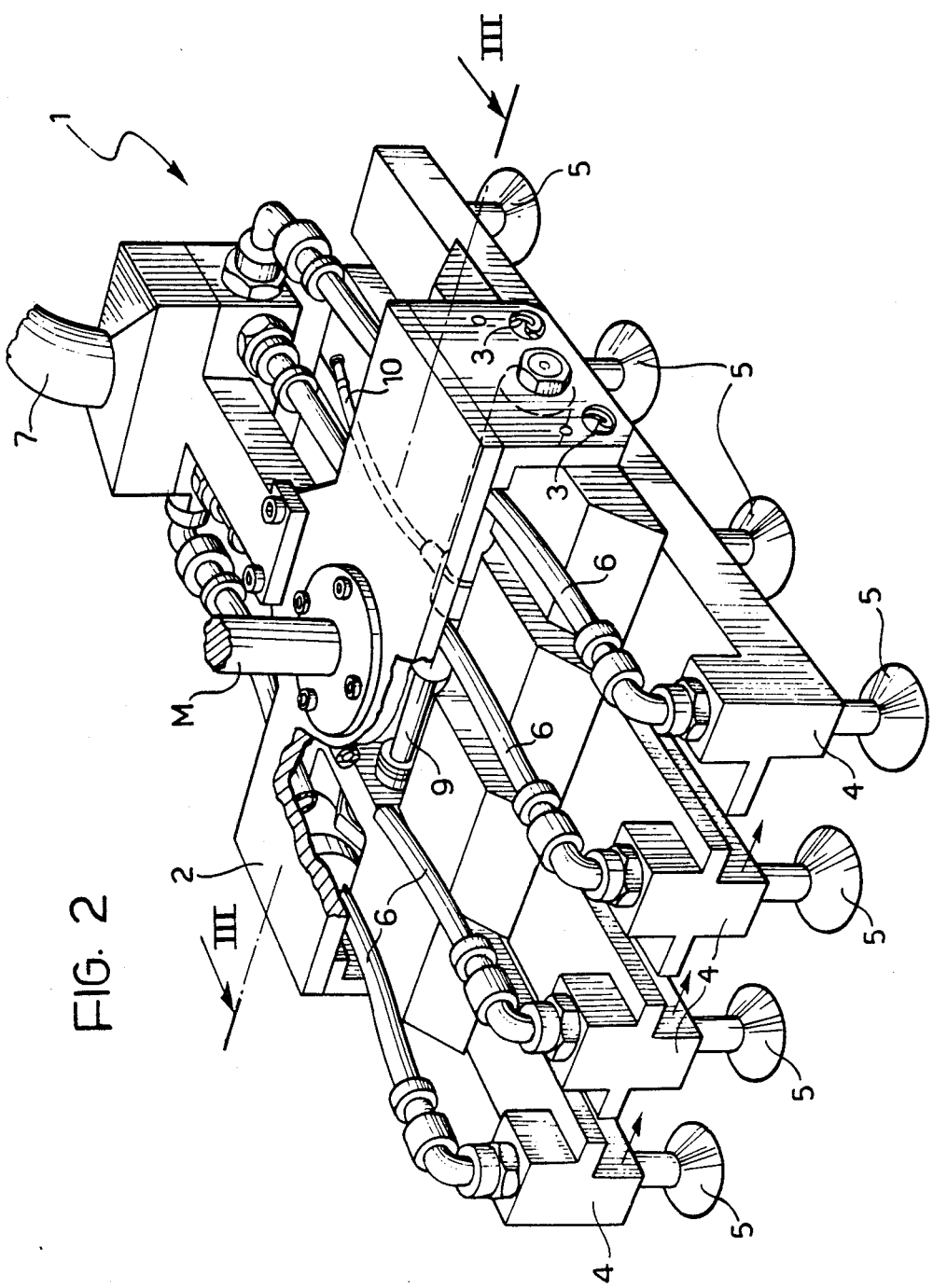
Figure 4:
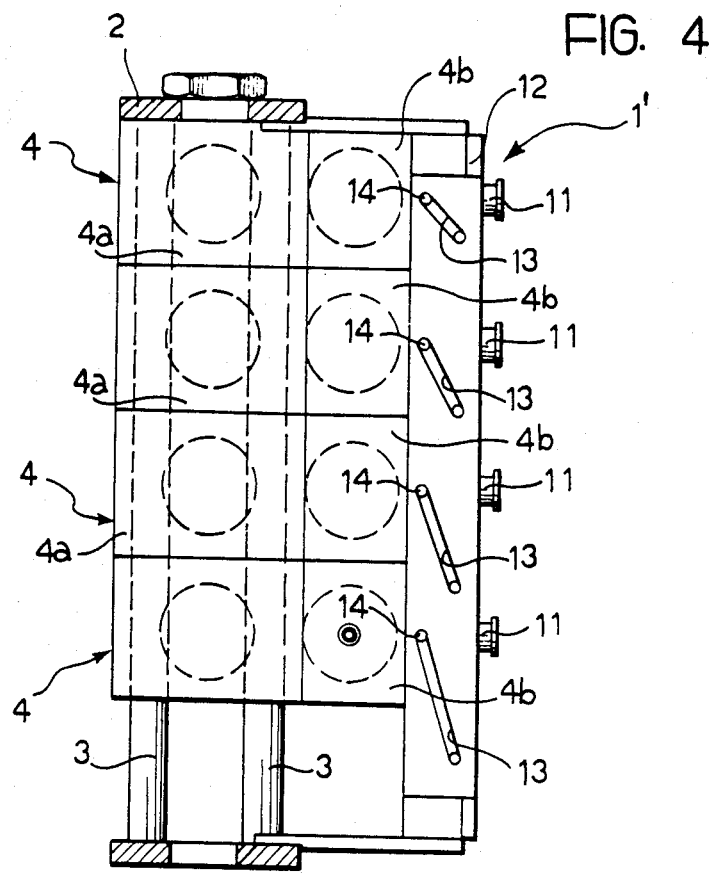
Figure 5:
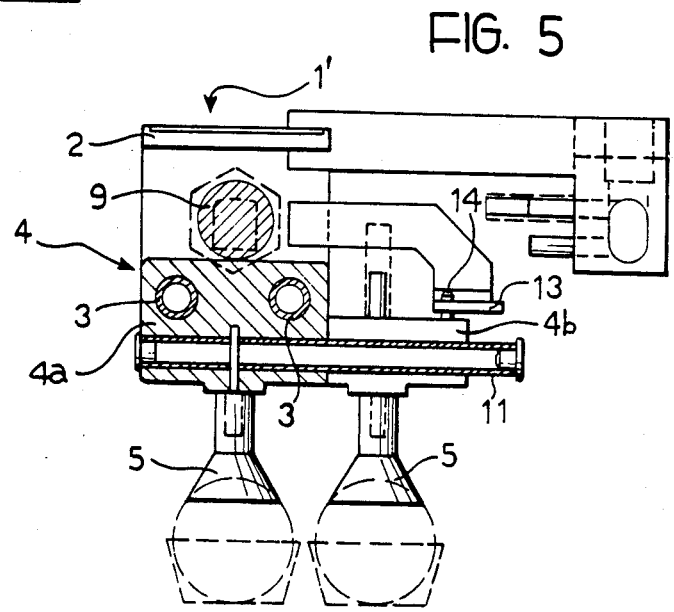

The invention will now be described, purely by way of non-limiting example, with reference to the appended drawings, in which:

FIG. 1 shows diagrammatically automatic lifting and conveying apparatus provided with a pick-up device according to the invention, FIG. 2 is a partially cut-away perspective view of a pick-up device according to the invention, FIG. 3 is a section taken on the line III—III of FIG. 2, FIG. 4 illustrates diagrammatically a further development of the pick-up device of the invention, and FIG. 5 is a section taken on the line V—V of FIG. 4.

In FIG. 1, automatic apparatus (automaton or robot) which enables the transfer of articles, constituted, for example, by chocolate, chocolate eggs, etc., from a first conveyor line $L_1$ to a second conveyor line $L_2$ is generally indicated T.

The conveyor line $L_1$ is constituted essentially by a conveyor belt on which a continuous array of articles A advances in parallel rows perpendicular to the direction of advance of the articles A on the conveyor.

For simplicity of illustration, reference will be made here only to the rows indicated $A_1$, $A_2$, $A_3$, etc., which are parallel to each other are extend perpendicular to the direction of advance of the articles.

In the embodiment illustrated, these rows, which are separated by a predetermined interval or spacing P, are substantially straight. The term "row" as used in the present specification and in the following claims, however, will be understood to extend, in addition, to different types of rows, such as, for example, zig-zag rows.

The second conveyor line $L_2$ is constituted essentially by another conveyor belt on which a continuous flow of boxes S moves. Each box S has within it a support plate having cells each intended to receive an article A.

The cells of the box S define an array comprising regular rows $B_1$, $B_2$, $B_3$ ... which are parallel to each other and, in the case shown by way of example, are in the form of straight rows extending perpendicular to the direction of advance of the articles A on the conveyor line $L_2$. The rows of cells $B_1$, $B_2$, $B_3$ ... are separated by a spacing or interval Q which is usually of a different magnitude from the spacing P between the adjacent rows of articles A on the conveyor line $L_1$.

The conveyor line $L_2$ extends in correspondence with the output or discharge end of the first line $L_1$ with the direction of advance of the boxes S perpendicular to the direction of advance of the articles A on the line $L_1$.

The apparatus T is disposed at an angle between the two lines $L_1$, $L_2$ and is constituted essentially by a column or pillar C having an arm D pivoted at its end in a generally flag-like configuration. As a result of pivoting about the central axis of the pillar or column C, the free end of the arm D describes a circular path having an annular extent of about 90°. The free end of the arm D may thus reciprocate between a first operating position and a second operating position illustrated respectively in full outline and in broken outline in FIG. 1.

In the first operating position, the free end of the arm D lies over the output end of the first conveyor line $L_1$. In the second operating position, however, it lies over the second conveyor line $L_2$.

On the free end of the pivoted arm D is mounted a fluid operated jack M with a downwardly-projecting rod which is movable vertically and carries at its lower end a pick-up device, generally indicated 1.

The operating sequence of the apparatus T (controlled by electronic and fluid control devices, not illustrated) provides for the cyclic repetition of the following phases:

pivoting of the arm D towards the first operating position with the pick-up device 1 in a raised position (relative to the conveyor lines $L_1$ and $L_2$), lowering of the pick-up device 1 towards the conveyor line $L_1$ with take-up of the articles A by the device 1, return of the pick-up device 1 (and of the articles A held thereby) to the raised position relative to the conveyor line $L_1$, rotation of the arm D to the second operating position with transfer of the articles towards the conveyor line $L_2$, lowering of the pick-up device 1 towards the second conveyor line $L_2$ with the consequent release of the articles A and their deposition in the boxes S, and return of the pick-up device 1 to the raised position relative to the conveyor line $L_2$.

Thus, as best seen in FIGS. 2 and 3, the device 1 includes a frame 2 which has a generally forked configuration and is supported centrally by the rod of the jack M.

The two ends or arms of the frame 2 are connected by two tubular guides 3 on which a plurality (four in the embodiment illustrated) of substantially identical support members 4 are slidable. Each of the members 4 is generally elongate and has a row of pick-up members 5 beneath it.

In the embodiment illustrated, the pick-up members 5 are of the suction type generally used for handling delicate or fragile articles.

In practice, each member 5 is constituted essentially by a suction cup into which opens a respective suction tube 6 terminating at a main suction pipe 7. The latter is connected in its turn to a subatmospheric ("vacuum") pressure source, such as, for example, a vacuum pump.

Between the support members 4, which are substantially parallel to each other, are helical springs 8 fitted on the guides 3 which extend generally perpendicular to the direction in which the support members 4 extend.

The springs 8 act as resilient means biasing the support members 4 apart. The moving apart induced by the springs 8, however, is opposed by a further fluid jack 9 which acts between one of the ends or arms of the forked frame 2 and the support member 4 furthest from this end.

In other words, the support members 4 and the springs 8 together form a pack which is resiliently compressible by the jack 9.

Consequently, actuation of the jack 9 can cause the support members 4 to move towards or away from each other, causing a corresponding movement of the adjacent rows of pick-up members 5 mounted thereon towards or away from each other.

It is thus possible to adjust the relative position of the support members 4 selectively so that the respective rows of pick-up members 5 are in the exact positions required for precise take-up of the articles A from the conveyor line $L_1$ for subsequent transfer to the boxes S.

Furthermore, during the pivoting of the arm D from the first to the second operating position, it is possible to activate the jack 9 so as to vary the relative positions of the support members 4 so as to increase or decrease the spacing between the adjacent rows of products A supported by the pick-up members 5 according to requirements.

More particularly, in the embodiment referred to in FIG. 1, if the jack 9 is operated to cause its axial contraction, the separation can be reduced from the value corresponding to the separation P between the rows $A_1$, $A_2$ ... on the first conveyor line $L_1$ to a value equal to the separation Q between adjacent rows $B_1$, $B_2$ ... of cells in the boxes S.

After the articles A have been deposited in the boxes S and the device 1 has been returned to the raised position above the conveyor line $L_2$, the jack 9 can be activated again to cause its extension, enabling the support members 4 to move away from each other under the resilient force of the springs 8.

In other words, the pick-up device according to the invention may be likened to a sort of hand provided with suction pick-up fingers which can be brought together or moved apart in at least one direction by means of the jack 9 controlled through a pneumatic line 10.

FIGS. 4 and 5 illustrate schematically a development of the pick-up device of the invention in which it is also possible to vary the distance between the pick-up members 5 associated with each support member 4 in addition to the distance between the adjacent support members 4.

FIGS. 4 and 5 relate, for simplicity of illustration, to pick-up device including four support members 4 each provided with only two pick-up members 5.

In the variant of FIGS. 4 and 5, the support members 4 are each constituted by two parts 4a and 4b of which one (the part 4b in the embodiment illustrated) is slidable on a guide 11 fixed to the other part 4a and extending perpendicular to the guides 3.

A plate member, indicated 12, is supported by the frame 2 and is provided with four slots 13 (one for each support member 4) extending in a direction generally inclined to the guides 3 and the guides 11.

In each support member 4, the "movable" part 4b has an appendage 14 which is slidably engaged in the corresponding slot 13.

Each slot 13 acts as a ramp body or member which, as a result of the movement of each support member 4 along the guides 3, causes the movement of the respective movable part 4b on the guide 11.

More particularly, each slot 13 is essentially straight and has an extent in the direction of the guides 11 substantially equal to the length of the movement of the movable parts 4b on the guides 11 themselves. The extent of each slot 13 in the direction of the guides 3, however, is equal to the length of the sliding movement of the corresponding support member 4 on the guides 3.

This latter dimension of the slots 13 is thus at a minimum in the case of the slot 13 associated with the support member 4 closest to the region in which the jack 9 is connected to the frame 2 and gradually increases for the slots 13 associated with the other support members 4 in the direction of movement away from the point of connection between the jack 9 and the frame 2.

As has been seen above (see FIG. 3 for this purpose) the jack 9 acts between one of the ends of the forked frame 2 and the support member 4 furthest from this end. The coordinated, proportionate movement of the other support members 4 (intended to ensure that the distances between the various support members 4 remain equal, although varying as a result of the operation of the jack 9) is in fact ensured by the resilient behaviour of the springs 8.

The function of the slots 13 illustrated in FIG. 4 is thus to ensure that, when the support members 4 move away from each other, each movable part 4b is moved correspondingly away from the respective fixed part 4a.

In a complementary manner, the moving together of the support members 4 caused by a contraction of the jack 9 has the effect of causing a corresponding moving together of the fixed and movable parts 4a and 4b of each support member. The pick-up device of FIGS. 4 and 5 is thus able to expand and contract selectively in two directions, selectively varying the separation between adjacent rows of pick-up members 5 and the distance between the adjacent pick-up members 5 in the row.

I claim:

1. A pick-up device comprising a plurality of pick-up members, the device including a plurality of generally elongate and mutually parallel support members, each of which support members carries an associated respective row of pick-up members extending longitudinally of the respective support member itself; the device including drive means acting on the support members which, when activated, simultaneously move the support members towards and away from each other; each of the support members being divided into at least two parts, each of the at least two parts carrying at least one associated respective pick-up member; the device further including movement transmission members for moving the at least two parts towards and away from each other simultaneously with movement of the support members, the movement transmission members causing a simultaneous relative movement of the at least two parts of the support member as a result of the simultaneous relative movements of the support members, the movement of the at least two parts of each support member being in a direction substantially perpendicular to the direction of movement of the support members relative to each other during simultaneous movement of the support members towards and away from each other, wherein the movement transmission members are comprised of at least one slot provided in a frame for each support member, the slot having profiled edges acting as ramparts, and at least one of the parts into which each support member is divided has an appendage which can slidingly cooperate with the profiled edges of the slot.

2. A device according to claim 1, including a frame having guide means extending substantially perpendicular to the support members for guiding the sliding movement of the support members themselves.

3. A device according to claim 1, wherein resilient means are interposed between the support members in a generally pack-like configuration, the resilient means biassing adjacent support members away from each other, and at least one drive member is provided which acts to move adjacent support members towards each other against the action of the resilient means.

4. A device according to claim 2 including at least one drive member acting between the frame and at least one of the support members so as to cause the support members to slide on the guide means.

5. A pick-up device according to claim 1, wherein the pick-up members are of the suction type.

* * * * *